UNITED STATES PATENT OFFICE.

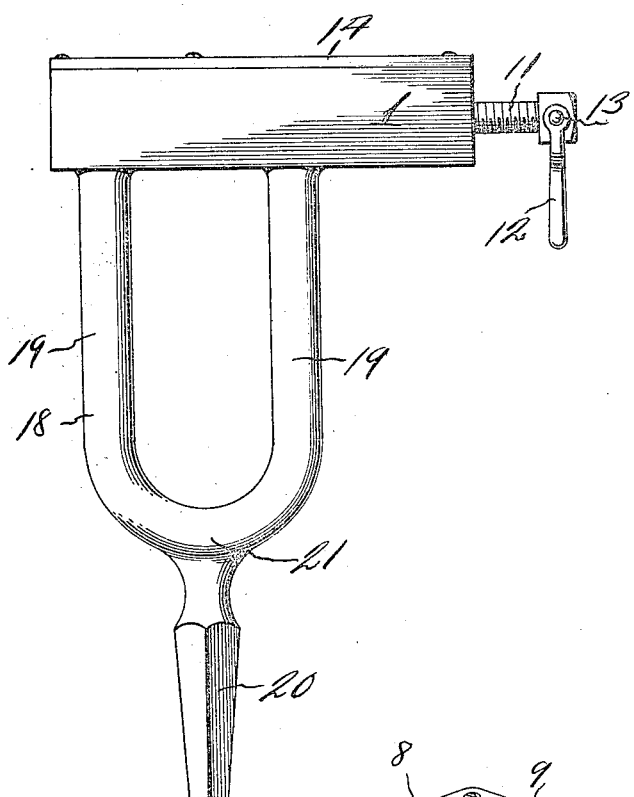
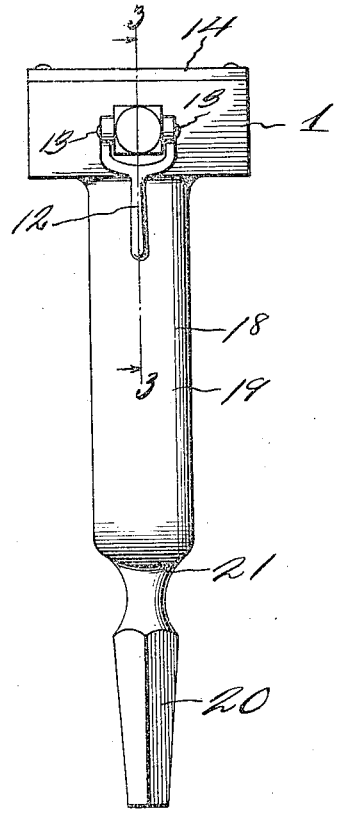
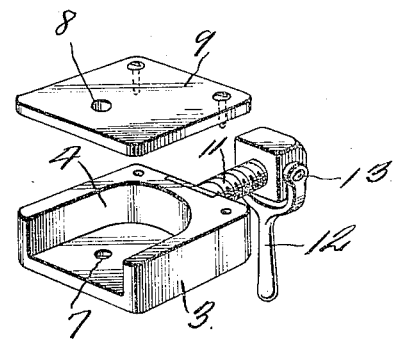

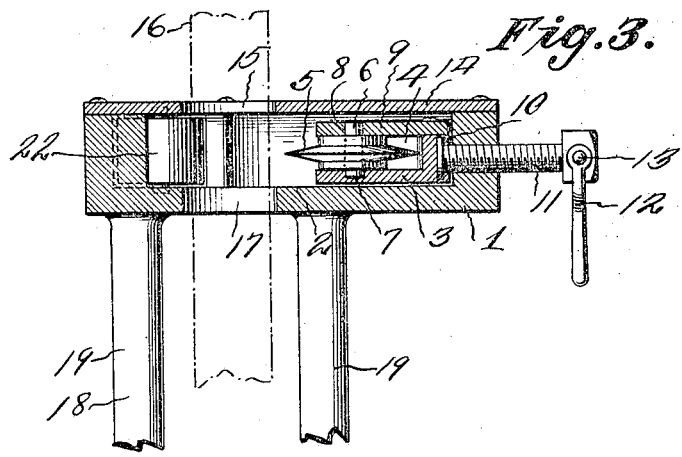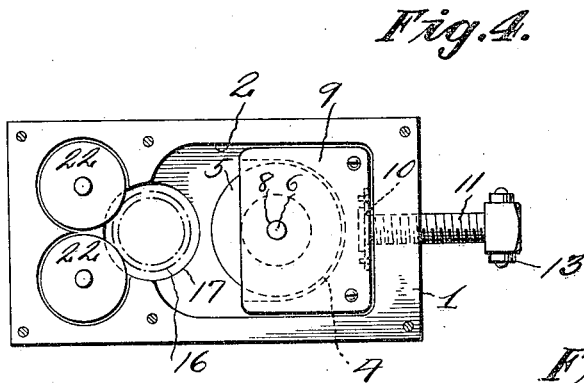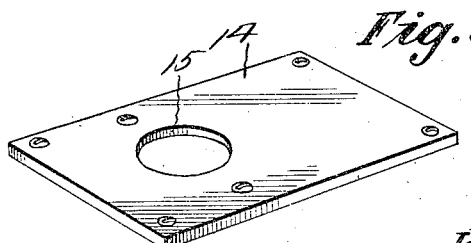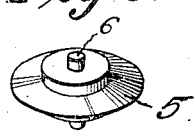

JOHN EDWARD DONNELLY, OF BRANFORD, AND ANTHONY JOSEPH GRIESER, OF NEW HAVEN, CONNECTICUT.

PIPE-CUTTER.

1,380,948.  Specification of Letters Patent.  Patented June 7, 1921.

Application filed March 19, 1920. Serial No. 367,096.

*To all whom it may concern:*

Be it known that we, JOHN EDWARD DONNELLY and ANTHONY J. GRIESER, citizens of the United States, residing at Branford and New Haven, respectively, in the county of New Haven, State of Connecticut, have invented a new and useful Pipe-Cutter; and we do hereby declare the following to be a full, clear, and exact description of the invention, such as will enable others skilled in the art to which it appertains to make and use the same.

The invention relates to pipe cutters and has for its object to provide a pipe cutter particularly adapted for use by electricians and fixture workmen, who during the course of their work find it necessary to cut off ends of piping, which ends are located either adjacent a wall or ceiling, and in such positions as it will be impossible to use a conventional form of pipe cutter. It being the present practice to cut off ends of pipes so positioned by means of a hack saw, which is an extremely slow and laborious method.

A further object is to provide a pipe cutter, which pipe cutter may be received and rotated by a turning tool, such for instance as a brace so that the pipe cutter may be utilized for cutting off pipes in various positions.

A further object is to provide a pipe cutter comprising a casing having an adjustable cutter therein, one face of said casing being provided with a U-shaped arch arching the pipe receiving aperture of the casing and provided with an axially alined shank adapted to be received by a brace so that the pipe cutter as a whole may be revolved during a pipe cutting operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the cutter holder.

Fig. 2 is an end elevation of the cutter holder.

Fig. 3 is a sectional view taken on line 3—3 of Fig. 2.

Fig. 4 is a plan view looking into the cutter carrying head.

Fig. 5 is a perspective view of the cutter head plate.

Fig. 6 is a perspective view of the wheel cutter.

Fig. 7 is a collective detail perspective view of the cutter wheel carrier.

Referring to the drawings, the numeral 1 designates a cutter head, which cutter head is chambered as at 2 so as to form a chamber for the reception of the cutter carrier 3, which cutter carrier is provided with a chamber 4 for the reception of a cutter wheel 5, said cutter wheel 5 being rotatably mounted on a pin 6, which pin has a bearing in the bottom of the chamber 4 as at 7 and as at 8 in the cover 9 of the cutter carrier. The cutter carrier has pivotally connected thereto as at 10 a feeding screw 11, which feeding screw is rotated from time to time during a pipe cutting operation by means of a toggle link 12, which is pivoted as at 13 to the feed screw 11. By providing the toggle 12 it will be seen that the screw 11 may be rotated even when a pipe is being cut close to a ceiling or wall, simply by pivoting the handled end of the toggle 12 from side to side as it reaches a vertical or horizontal position according to whether the pipe is being cut adjacent a wall or ceiling. The cutter head 1 is provided with a cover plate 14, which plate has an aperture 15 therein through which the pipe 16, which is desired to be cut is passed, there being an aperture 17 in the bottom wall of the chambered cutter head and which aperture registers with the aperture 15 so that the pipe will pass through the cutter head, thereby allowing the pipe to be severed adjacent a wall or ceiling. Integrally joined to the under face of the cutter head 1 is a U-shaped member 18, which member arches the aperture 17 so as not to interfere with the passage of the pipe 16 between the arms 19 of the U-shaped member. A shank 20 is integrally joined to the arch portion 21 of the U-shaped member and is in axial alinement with the apertures 15 and 17. The shank 20 is adapted to be received by a brace so that the pipe cutter as a whole may be rotated when it is desired to cut off the end of a pipe. As the cutter head is rotated by the brace the feed shaft 11 is from time to time rotated so as to feed the cutter 5 inwardly until said cutter has severed the pipe.

Rotatably mounted in bearings of the bottom wall of the cutter head 1 and in bearings of the cover 14 are rollers 22, which rollers engage the pipe 16 on the opposite side of the cutter engaging point and on each side of a longitudinal center line through the head, thereby forming bearings against which the pipe engages during the rotation of the cutter as a whole. Rollers 22 also form means whereby during a cutting operation a bur or outwardly extending portion will be prevented from being formed on the pipe, which bur or outwardly extending portion is common in cases where conventional forms of pipe cutters are used, especially those having three cutter wheels. Where such burs form it has been necessary to remove the same by filing before a thread can be applied to the end of the pipe, therefore it will be seen that by providing rollers that the above difficulty is obviated.

The invention having been set forth what is claimed as new and useful is:—

A pipe and rod cutter comprising a cutter head having a rectangular shaped chamber therein, a removable cover for said chamber, pipe receiving apertures extending through the cutter head and its cover, rollers disposed in the chamber of the cutter head and having bearings in the bottom of the chamber and in the cover and adapted to engage a pipe during a cutting operation, a slidable rectangular shaped cutter carrier disposed in the chamber, a cutter wheel pivoted in a chamber of the carrier, said chamber being provided with a detachable cover in which the cutter has a bearing, a threaded adjusting screw threaded through the end wall of the cutter head and pivoted to the cutter carrier, said adjusting screw being radially disposed in relation to the cutter and in the same plane as the cutter.

In testimony whereof we have signed our names to this specification in the presence of two subscribing witnesses.

JOHN EDWARD DONNELLY.
ANTHONY JOSEPH GRIESER.

Witnesses:
   FILOMENA A. DE VITA,
   G. FRANK CARELLI.